June 5, 1928. 1,672,566
A. E. GLANCY ET AL
LENS MEASURING INSTRUMENT
Filed March 31, 1924
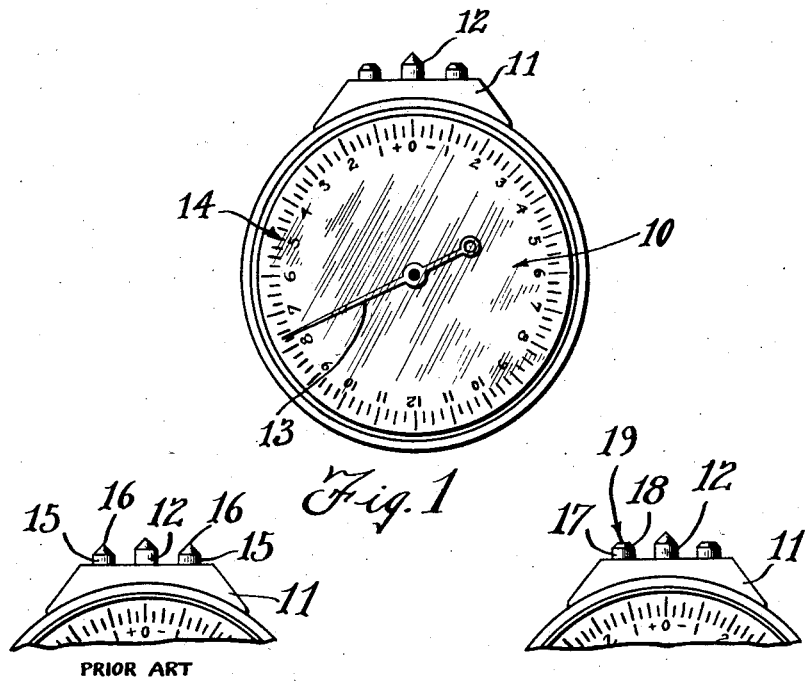
Fig. 1
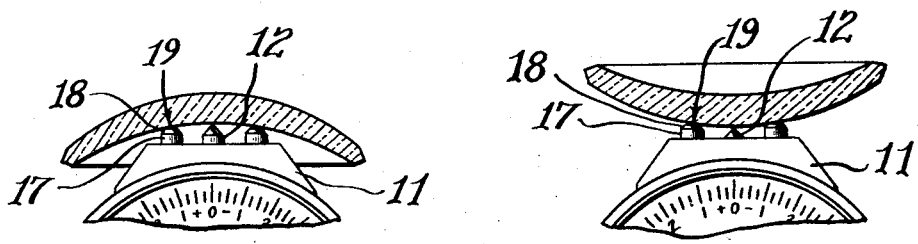
PRIOR ART
Fig. 2.  Fig. 3.
Fig. 4.  Fig. 5.
Fig. 6.
INVENTOR
A.E. Glancy.
E.D. Tillyer.
BY
Harry H. Styll
ATTORNEY Patented June 5, 1928.

1,672,566

UNITED STATES PATENT OFFICE.

ANNA E. GLANCY AND EDGAR D. TILLYER, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

LENS-MEASURING INSTRUMENT.

Application filed March 31, 1924. Serial No. 703,125.

The present invention relates to an improved lens measuring instrument of the type which are designed to measure the curvature of a lens.

An important object of our invention is to provide a lens measuring instrument with improved lens supporting pins so that they will always give an accurate reading.

Another important object of the invention is to provide improved lens supporting pins for a lens measuring instrument that will be devoid of the rounding over features of such pins in the past.

Other objects and advantages of the invention will become apparent during the course of the following description.

In the drawings wherein like numerals are employed to designate like parts throughout the same:

Figure 1 is an elevation illustrating our invention in use upon a lens measuring instrument;

Figure 2 is a fragmentary view of such an instrument illustrating the prior art constructions;

Figure 3 shows our improved construction;

Figure 4 shows the position of a lens when measuring a negative power;

Figure 5 shows the same when measuring a positive power;

Figure 6 is a top plan view of our invention.

In the drawings, wherein for the purposes of illustration is shown the preferred embodiment of our invention, the numeral 10 designates a lens measuring instrument such as is commonly used to measure the curvature of a lens. The lens measure 10 is provided with a pin support 11 through which is slidably mounted the movable pin 12 which has connection with a rotatable pointer member 13 which cooperates with the graduations 14 to designate the curvature of the lens measured.

As is shown in Figure 2 in the prior art constructions the block 11 carried the lens supporting pins 15 which had the pointed ends 16. In the use of this construction the lens was placed upon the stationary pins 15 on the point 16 thereof and moved the movable plunger pin 12 which caused the pointer 13 to designate the curvature of the lens measured. When a lens measure having the pointed lens supporting pins 15 was used for any great length of time the points 16 gradually rounded over sufficiently to give an inaccurate measurement of a lens measure. It was almost impossible to regrind a point upon the pins 15 in view of the fact that one of many difficulties may be experienced in resetting the pins 15 in their proper relation to the movable plunger pin 12. The point 16 may not be centralized with respect to the pin 15 so that one of the points 16 would be relatively closer to the plunger pin 12 than the other so as to give an inaccurate measurement.

In accordance with the present invention we utilize the supporting block 11 and the movable plunger pin 12. However, we use as stationary supporting pins the pins 17 which have the tapered ends 18 with the flat head 19. In other words, instead of having the point 16, as is shown in Figure 2, we have the supporting pins 17 with the flat heads 19 as is shown in Figures 3 and 6.

In Figure 4 is shown the position of a lens when measuring a negative power upon the flat headed pins 17, while in Figure 5 is shown the position of a lens when measuring a positive curvature. In other words, in one type of lens the supporting point of contact is on one side of the flat head, while in measuring another type of lens it will be on the opposite side of the head. The diameter of the flat head 19 may readily be ascertained so that the required calculations may be made to give an accurate measurement of the lens. The advantages of having the flat headed supporting pin are that it will not wear over and throw the instrument out of adjustment and at the same time accurate readings will always be had. The movable plunger pin 12 will be arranged as in the prior art constructions, that is to say, intermediate the two stationary lens supporting pins 17.

It is to be understood that the allowances made for the differences in the points of contact in measuring a positive curve and a negative curve will depend upon the diameter of the flat head 19. It will thus be seen that in constructing the lens supporting pins 17 with the tapered end 18 and flat head 19 that we have made it possible to obtain accurate measurements from such lens measuring instruments, while in the prior art constructions the lens supporting pins become so worn out that such accurate adjustments are almost impossible.

It is to be understood that the form of our invention herewith shown and described is to be taken as the preferred embodiment of the same and that various changes in the size, shape and arrangements of parts may be resorted to without departing from the spirit of the invention or the scope of the subjoined claim.

We claim:

A lens measuring instrument including a movable plunger and a plurality of stationary pins, said stationary pins having flat heads with sharp shoulders between the head and the side of the pin.

ANNA E. GLANCY.
EDGAR D. TILLYER.